United States Patent
Salter et al.

(10) Patent No.: US 10,075,013 B2
(45) Date of Patent: Sep. 11, 2018

(54) VEHICLE APPARATUS FOR CHARGING PHOTOLUMINESCENT UTILITIES

(71) Applicant: Ford Global Technologies, LLC, Dearborn, MI (US)

(72) Inventors: Stuart C. Salter, White Lake, MI (US); Annette Lynn Huebner, White Lake, MI (US); Kristin Ann Hellman, Walled Lake, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 15/259,635

(22) Filed: Sep. 8, 2016

(65) Prior Publication Data

US 2018/0069426 A1 Mar. 8, 2018

(51) Int. Cl.
*H01M 10/44* (2006.01)
*H01M 10/46* (2006.01)
*H02J 7/35* (2006.01)
*B60R 7/06* (2006.01)
*H05B 37/02* (2006.01)
*B60Q 3/18* (2017.01)

(52) U.S. Cl.
CPC ............... *H02J 7/35* (2013.01); *B60Q 3/18* (2017.02); *B60R 7/06* (2013.01); *H05B 37/0227* (2013.01); *B60Q 2900/00* (2013.01)

(58) Field of Classification Search
CPC .. H02J 7/35; H02J 7/355; B60Q 3/048; B60Q 3/008; B60Q 3/042
USPC .................... 320/101; 362/84, 487
See application file for complete search history.

(56) References Cited

U.S. PATENT DOCUMENTS

| | | | |
|---|---|---|---|
| 2,486,859 | A | 11/1949 | Meijer et al. |
| 5,053,930 | A | 10/1991 | Benavides |
| 5,434,013 | A | 7/1995 | Fernandez |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,196,241 | B1 | 3/2001 | Doolan |
| 6,207,077 | B1 | 3/2001 | Burnell-Jones |
| 6,294,990 | B1 | 9/2001 | Knoll et al. |
| 6,419,854 | B1 | 7/2002 | Yocom et al. |
| 6,494,490 | B1 | 12/2002 | Trantoul |
| 6,577,073 | B2 | 6/2003 | Shimizu et al. |
| 6,599,444 | B2 | 7/2003 | Burnell-Jones |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |

(Continued)

FOREIGN PATENT DOCUMENTS

| | | |
|---|---|---|
| CN | 2927780 Y | 8/2007 |
| CN | 101337492 A | 1/2009 |

(Continued)

*Primary Examiner* — Edward Tso
(74) *Attorney, Agent, or Firm* — Vichit Chea; Price Heneveld LLP

(57) ABSTRACT

A vehicle charging compartment is disclosed. The compartment comprises a charging device comprising a plurality of light sources configured to emit a charging emission. The light sources are disposed on an interior surface formed by the compartment. A controller is configured to selectively illuminate the charging device in response to an environmental condition and a vehicle fault communicated to the controller.

20 Claims, 5 Drawing Sheets

(56) References Cited

U.S. PATENT DOCUMENTS

| | | |
|---|---|---|
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,326,435 B2 | 2/2008 | Buckingham et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,075,801 B2 | 12/2011 | Jones |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,282,858 B2 | 10/2012 | Agrawal et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,329,061 B2 | 12/2012 | Jia |
| 8,333,907 B2 | 12/2012 | Comanzo et al. |
| 8,408,766 B2 | 4/2013 | Wilson et al. |
| 8,409,662 B2 | 4/2013 | Agrawal et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,506,843 B2 | 8/2013 | Srivastava et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,080,764 B2 | 7/2015 | Gonzalez |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0043336 A1 | 3/2006 | van Schoor |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2012/0304512 A1 | 12/2012 | Martin et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0293617 A1 | 10/2014 | O'Kell |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0166883 A1 | 6/2015 | Krook |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201169230 Y | 2/2009 |
| CN | 201193011 Y | 2/2009 |
| CN | 101485511 A | 7/2009 |
| CN | 201379161 Y | 1/2010 |
| CN | 201480243 U | 5/2010 |
| CN | 202698032 U | 1/2013 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |

(56) References Cited

FOREIGN PATENT DOCUMENTS

| | | |
|---|---|---|
| WO | 2008148138 A1 | 12/2008 |
| WO | 2014068440 A1 | 5/2014 |
| WO | 2014161927 A1 | 10/2014 |

VEHICLE APPARATUS FOR CHARGING PHOTOLUMINESCENT UTILITIES

FIELD OF THE INVENTION

The present invention generally relates to a charging apparatus and more specifically relates to a charging apparatus for a vehicle storage compartment.

BACKGROUND OF THE INVENTION

Modern vehicles utilize various systems to improve convenience and ease of use. Some vehicles may utilize various illumination devices to enable occupants to more easily store and/or organize belongings in various storage compartments.

SUMMARY OF THE INVENTION

According to one aspect of the present invention, a vehicle charging compartment is disclosed. The compartment comprises a charging device comprising a plurality of light sources configured to emit a charging emission. The light sources are disposed on an interior surface formed by the compartment. A controller is configured to selectively illuminate the charging device in response to an environmental condition and a vehicle fault communicated to the controller.

According to another aspect of the present invention, a vehicle charging compartment is disclosed. The compartment comprises a charging device comprising a plurality of light sources. The light sources are configured to emit a charging emission and are disposed on an interior surface formed by the compartment. The charging compartment further comprises a light sensor configured to monitor an ambient light proximate the vehicle and a controller. The controller is configured to selectively illuminate the charging device in response to a vehicle fault communicated to the controller and the ambient light being less than a brightness threshold.

According to yet another aspect of the present invention, a method for controlling a charging apparatus for a vehicle storage compartment is disclosed. The method comprises detecting a control signal corresponding to at least one of an environmental condition and a vehicle fault condition. The method continues by identifying a closure status of an access door of a storage compartment. In response to the closure status and the control signal, the method may continue by activating a light source to emit a charging emission. The charging emission is configured to charge a photoluminescent material disposed in the storage compartment.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
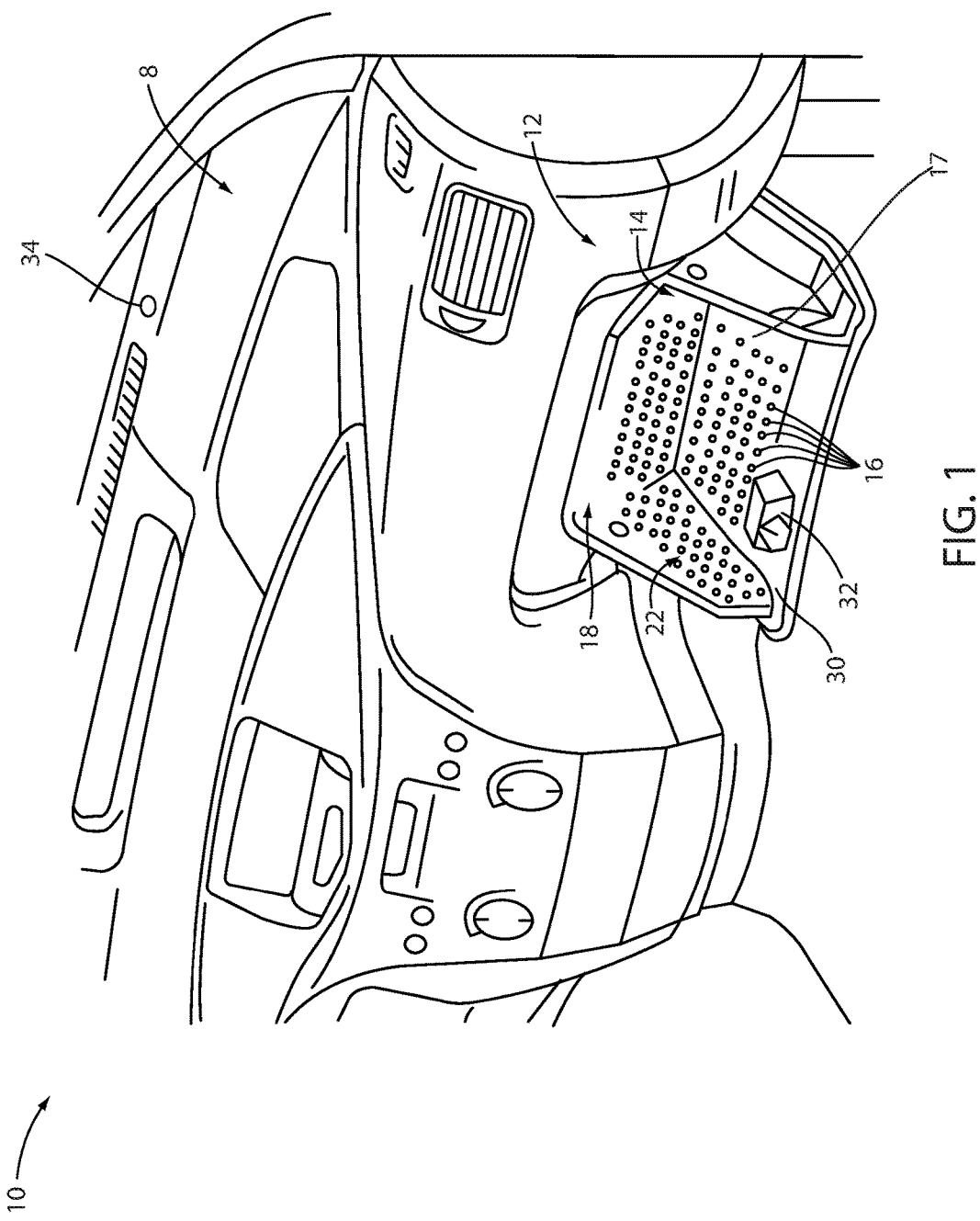
FIG. 1 is a perspective view of a passenger compartment of a vehicle demonstrating an illuminated storage compartment.

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarity. For example, a first portion and a second portion may be referred to in some implementations and only a second portion may be referred to in some additional implementations. Such designations may serve to demonstrate exemplary arrangements and compositions and should not be considered to designate a specific number of elements or essential components of any specific implementation of the disclosure, unless clearly specified otherwise. These designations, therefore, should be considered to provide clarity in reference to various possible implementations of the disclosure which may be combined in various combinations and/or individually utilized to clearly reference various elements of the disclosure.

The following disclosure describes a charging apparatus for a vehicle. The charging apparatus may be disposed in a storage compartment, which may be configured to receive an article or device comprising a persistent luminescent material disposed on or dispersed in at least one surface. The charging device may correspond to a light source configured to output an emission of light or a charging emission configured to charge the persistent luminescent material. The charging apparatus may comprise a controller, which may be in communication with various sensors and/or a vehicle control module. In this configuration, the controller may be configured to respond to one of more control signals or inputs from the sensors and/or the vehicle control module to selectively activate the charging device to emit the charging emission. As discussed herein, the articles or devices comprising the persistent luminescent material may be referred to as photoluminescent objects.

In various embodiments, the charging apparatus may be operable to charge a photoluminescent object in the storage compartment such that the persistent luminescent material emits an output emission that may illuminate the article or device. In some embodiments, the controller may be configured to control the charging device such that the charging device is charged to emit an output emission prior to an expected or probable use of the photoluminescent object. For example, in response to a vehicle fault communicated from the vehicle control module, the controller may activate the charging apparatus for predetermined period of time to charge the photoluminescent object, which may correspond to an illuminated umbrella, high visibility clothing, road hazard triangle, or various objects that may be used in the event of the vehicle fault. In this way, the photoluminescent object may be charged that the persistent photoluminescent material may illuminate a photoluminescent object to improve a visibility of the photoluminescent object during a roadside repair.

Figure 2:
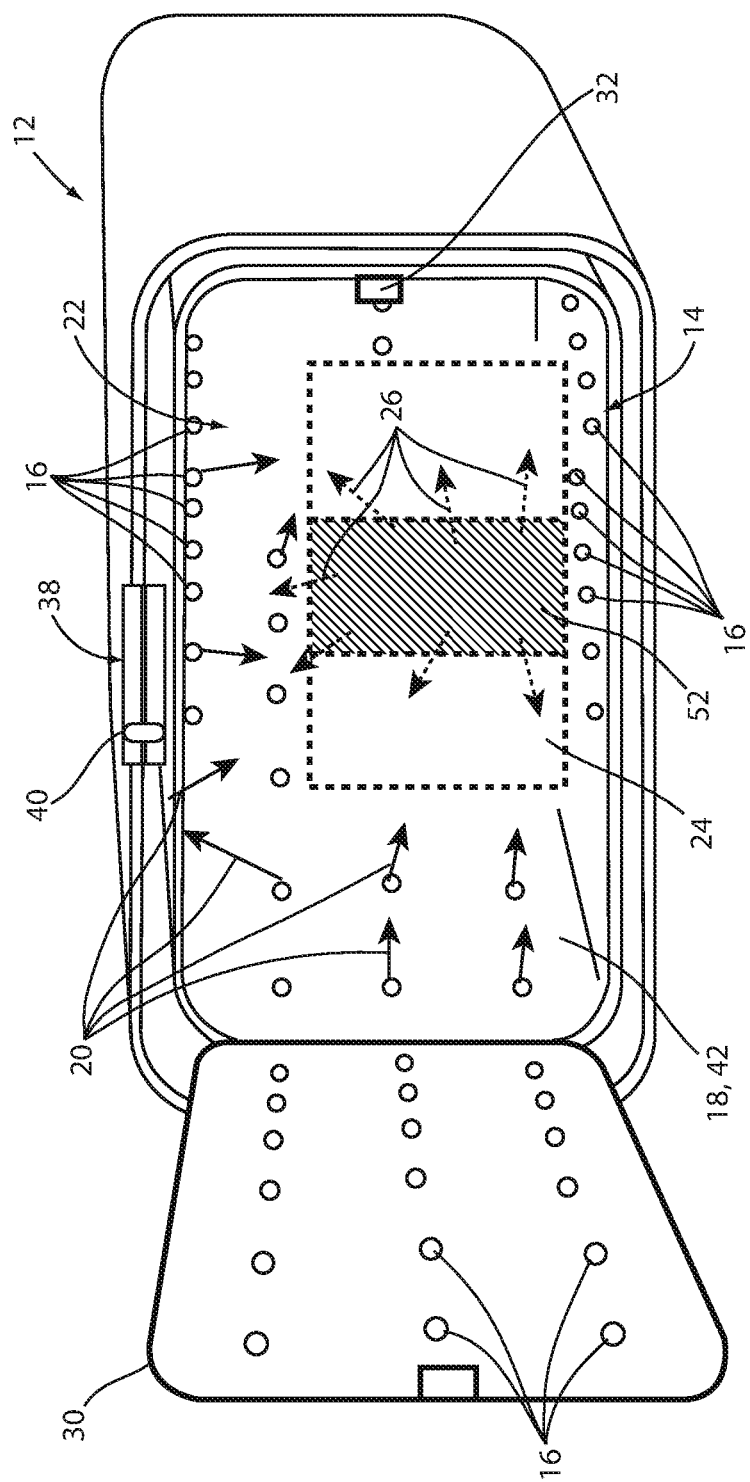
FIG. 2 is a detailed perspective view of a storage compartment demonstrating an illumination apparatus.

Referring now to FIGS. 1-2, a passenger compartment 8 of a vehicle 10 is shown having a charging apparatus 12. The charging apparatus 12 may comprise a lighting device 14 having a plurality of light sources 16. The light sources 16 may be disposed on an interior surface 17 of a storage compartment 18 of the vehicle 10. In this configuration, the charging apparatus 12 may be configured to activate the lighting device 14 to emit a charging emission 20 into a cavity or interior volume 22 formed by the storage compartment 18. In various embodiments, the charging apparatus 12 may further comprise a controller in communication with a vehicle control module and/or one or more sensors. In this way, the controller may selectively activate the charging apparatus 12 such that the photoluminescent object 24 is charged to emit an output emission 26 prior to an expected or probable use of the photoluminescent object 24. Further details of the controller are discussed in reference to FIG. 5.

For example, in the event of a vehicle fault, the vehicle control module may communicate a fault signal to the controller. Additionally, the operation of the vehicle may fail or the operator of the vehicle may be prompted or required to stop the vehicle 10. In response to receiving the fault signal, the controller may activate the charging apparatus 12, in anticipation of the operator or a passenger of the vehicle 10 accessing and utilizing the photoluminescent object 24 to assist in resolving the vehicle fault. For example, the photoluminescent object 24 may correspond to a variety of tools, garments, and/or devices that may be utilized to assist in resolving the vehicle fault. For example, the photoluminescent object 24 may correspond to a jack, road hazard marker, high visibility garment, illuminated umbrella, and/or various devices that may be associated for use with a vehicle or in a road hazard scenario. In this way, the charging apparatus 12 may charge the photoluminescent object 24 to improve a visibility of the object.

The light sources 16 of the light device 14 may be configured to emit the charging emission 20 as a high intensity emission of light that may be distracting to an occupant of the vehicle 10 if witness during a charging operation. Accordingly, the storage compartment 18 may be equipped with an access door 30 configured to significantly prevent the charging emission 20 from entering the passenger compartment 8 while providing access to the interior volume 22 of the storage compartment 18. To ensure that the access door 30 is closed when the charging emission 20 is activated, the charging apparatus 12 may further comprise a door sensor 32 in communication with the controller. In this configuration, the door sensor 32 may be configured to identify a closed status of the access door 30. Accordingly, the controller may control the activation of the light source to only activate when the door sensor 32 indicates the closed status of the access door 30.

In some embodiments, the controller of the charging apparatus 12 may further be in communication with an ambient light sensor 34. The ambient light 34 sensor may be disposed on a portion of the vehicle 10 where local environmental light may reach a photo-sensor of the light sensor 34. In this configuration, the controller may be configured to monitor the ambient light proximate the vehicle 10. If the ambient light exceeds a brightness threshold, the controller may suppress the activation of the charging apparatus 12. Additionally, upon an indication that the ambient light level is below the brightness threshold, the controller may withdraw the suppression of the charging apparatus 12 such that the photoluminescent object 24 may be charged in response the control module communicating the vehicle fault.

In some embodiments, the charging apparatus 12 may be in communication with a rain sensor via a communication bus and/or the control module of the vehicle 10. For example, the charging apparatus 12 may be configured to activate the lighting device 14 to output the charging emission 20 in response to the rain sensor indicating a condition of rain and/or precipitation proximate the vehicle 10. In response to the rain condition, the controller may activate the charging emission 20 to charge the photoluminescent object 24. Such an embodiment, may be particularly beneficial when the photoluminescent object 24 corresponds to a high visibility garment or illuminated umbrella as discussed in reference to FIG. 3.

The controller may further control the charging apparatus 12 to charge the photoluminescent object 24 in response to receiving the indication of the rain condition from the rain sensor in combination with the indication from the light sensor 34. For example, utilizing the high visibility garment 24f or illuminated umbrella 24g may be more likely during conditions wherein the ambient light level is below the brightness threshold and precipitation is detected. In such implementations, the charging apparatus may be configured to identify and charge the photoluminescent object 24 during conditions corresponding to low light and precipitation to conserve energy that may otherwise be expended while charging the photoluminescent object 24.

In some embodiments, the charging apparatus 12 may comprise one or more control circuits 38 that may allow for an occupant of the vehicle 10 to manually control the lighting device 14. Such control circuits 38 may comprise a user interface or switch 40 configured to manually activate the charging apparatus 12. In such embodiments, the controller may similarly activate the charging apparatus 12 and may suppress the activation of the charging emission 20 until the door sensor 32 indicates that the access door 30 is closed. Accordingly, the charging apparatus 12 may be configured to operate in response to various inputs alone or in combination as described herein to provide for flexible implementation in a variety of applications and locations of the vehicle 10.

In some embodiments, the interior surface 18 of the storage compartment 18 may comprise a reflective coating 42. The reflective coating 42 may correspond to a metallic coating, metallic paint, mirrored surface finish or a variety of reflective coatings. The reflective coating 42 may serve to reflect the charging emission 20 with the storage compartment 18. In this configuration, the charging emission 20 may be reach portions of the photoluminescent object 24 that may otherwise be blocked or obstructed by the photoluminescent object 24 or various objects that may be stored in the storage compartment 18.

Figure 3:
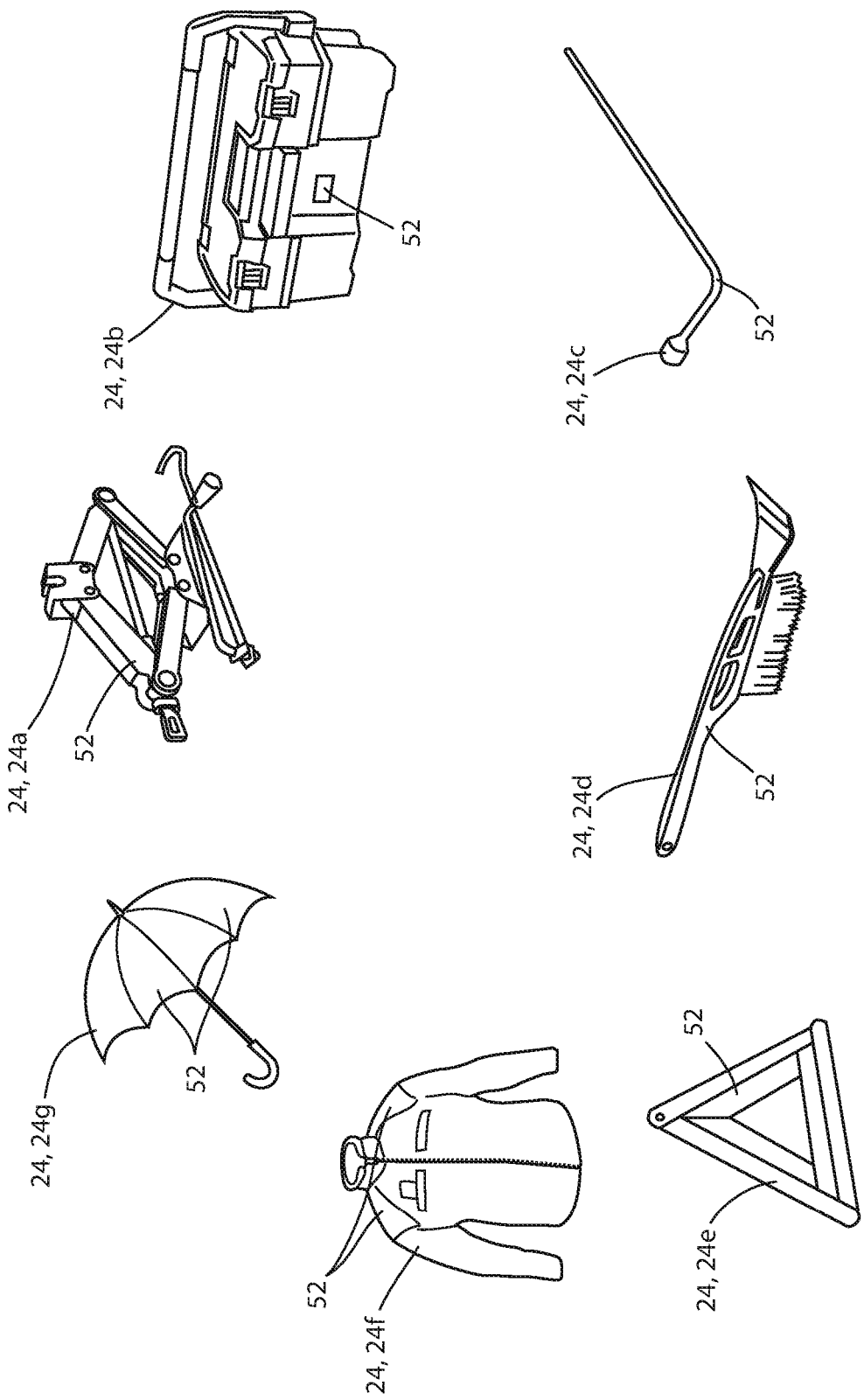
FIG. 3 is perspective view of a plurality of utilities that may comprise persistent luminescent material that may be charged in the storage compartments as discussed herein.

Referring now to FIGS. 2 and 3, in operation, the charging emission 20 may be emitted from the light sources 16 to illuminate and/or charge a persistent luminescent material of one or more photoluminescent objects 24 disposed in the storage compartment 18. As demonstrated in FIG. 3, the photoluminescent objects 24 may correspond to a variety of articles, tools, and/or utilities that may be stored in a storage compartment of the vehicle 10. For example, a photoluminescent object 24 may correspond to a jack 24a, tool or storage container 24b, a tire iron or hand tool 24c, an ice scraper/snow brush 24d, a road hazard marker 24e, high visibility garment 24f, an illuminated umbrella 24g, and/or various devices that may be utilized in relation to the vehicle 10, particularly in a road hazard scenario. In this way, the charging apparatus 12 may charge the photoluminescent object 24 to improve a visibility of the objects.

The charging emission 20 emitted from the light sources 16 may correspond to a first wavelength of light configured to charge the persistent luminescent material of the photoluminescent object 24. In response to receiving the charging emission, the photoluminescent object 24 may charge and retain a charge of potential energy and emit an output emission 26 having a second wavelength different from the first wavelength. In some embodiments, the output emission 26 may comprise one or more wavelengths, one of which may be longer than the first wavelength and the second wavelength.

In some embodiments, the output emission 26 may correspond to a plurality of wavelengths. Each of the plurality of wavelengths may correspond to significantly different spectral color ranges. For example, the output emission 26 may correspond to a plurality of wavelengths configured to correspond to a specific color that may be different from a color of the charging emission 20. The plurality of wavelengths may be generated by a red-emitting luminescent material having a wavelength of approximately 620-750 nm, a green emitting luminescent material having a wavelength of approximately 526-606 nm, and a blue or blue green emitting luminescent material having a wavelength of approximately 400-525 nm.

The persistent luminescent materials as discussed herein may correspond to phosphorescent materials. Persistent luminescent materials may correspond to alkaline earth aluminates and silicates, for example doped (di)silicates. Such substances may incorporate persistent luminescent phosphors or other doped compounds. Persistent luminescent substances may be doped with one or more ions, which may correspond to rare earth elements, for example: $Eu^{2+}$, $Tb^{3+}$, $Dy^{3+}$, and $R^{3+}$. Persistent luminescent materials may be defined as being operable to carry a charge and discharge light for a period of several minutes. For example, persistent luminescent materials as described herein may have an afterglow decay time longer than several minutes. The decay time may be defined as the time between the end of the excitation and the moment when the light intensity of the photoluminescent material drops below a minimum visibility of 0.32 $mcd/m^2$. The minimum visibility is roughly 100 times the sensitivity of the dark-adapted human eye, which corresponds to a definition used in the safety signage and by various researchers of luminescent properties.

A persistent luminescent material as discussed herein may be operable to emit light at an intensity of 0.32 $mcd/m^2$ after a decay time of 10 minutes. In an exemplary embodiment, a persistent luminescent material may be operable to emit light at an intensity of 0.32 $mcd/m^2$ after a decay time of 30 minutes and in some embodiments for a period longer than 60 minutes. In an exemplary embodiment, a persistent luminescent material may have a luminance ratio of greater than or equal to 20% of a first intensity after 10 minutes of decay time relative to a second intensity after 30 minutes of decay time. Additionally, in some embodiments, a persistent luminescent material may have a luminance ratio of greater than or equal to 10% of a first intensity after 10 minutes of decay time relative to a second intensity after 60 minutes of decay time.

As discussed herein, persistent luminescent materials may be operable to store energy received from the charging emission 20 or any form of activation emission or a corresponding wavelength of light. The stored energy may then be emitted from the persistent luminescent material for a wide range of times, some extending up to approximately 24 hours. Such materials, when utilized in various luminescent portions 52 of the photoluminescent objects 24 may provide for a sustained emission of the output emission 26 in response to the charging emission 20 impinging upon the luminescent portions 52 while contained in the storage compartment 18 of the vehicle 10. The controller may control the charging period by activating the light sources 16 to irradiate one or more of the photoluminescent objects 24 for a predetermined charging period. In this way, the controller may charge the photoluminescent object 24 in anticipation of a use of the photoluminescent objects 24. As previously discussed, the controller may identify such probable times of use of the photoluminescent objects 24 in response to a vehicle condition communicated from the vehicle control module; an environmental condition indicated by a rain sensor, light sensor, etc.; and/or various inputs that may be communicated by one or more sensors or systems of the vehicle 10.

The photoluminescent materials discussed herein may correspond to organic or inorganic fluorescent dyes configured to convert the charging emission 20 to the output emission 26. For example, the photoluminescent materials may comprise a photoluminescent structure of rylenes, xanthenes, porphyrins, phthalocyanines, or other materials suited to a particular Stokes shift defined by an absorption range and an emission fluorescence. In some embodiments, the photoluminescent materials may be of at least one inorganic luminescent material selected from the group of phosphors. The inorganic luminescent material may more particularly be from the group of Ce-doped garnets, such as YAG:Ce. As such, each of the photoluminescent portions may be selectively activated by a wide range of wavelengths received from the activation emission configured to excite one or more photoluminescent materials to emit an output emission 26 having a desired color.

As discussed herein, each of the luminescent portions 52 may comprise one or more photoluminescent and/or persistent luminescent materials. The luminescent portions 52 may be applied to various surfaces of the photoluminescent objects 24. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

The light sources 16 as described herein may correspond to any form of light source or light generating device. For example, the light sources 16 may correspond to one or more light generating devices such as halogen lights, fluorescent lights, light emitting diodes (LEDs), organic LEDs (OLEDs), polymer LEDs (PLEDs), solid state lighting or any other form of lighting. As such, the light sources 16 may be configured to emit the charging emission 20 configured to correspond to the absorption range or ranges of the luminescent materials of each of the luminescent portions 52 of the photoluminescent objects 24.

Figure 4:
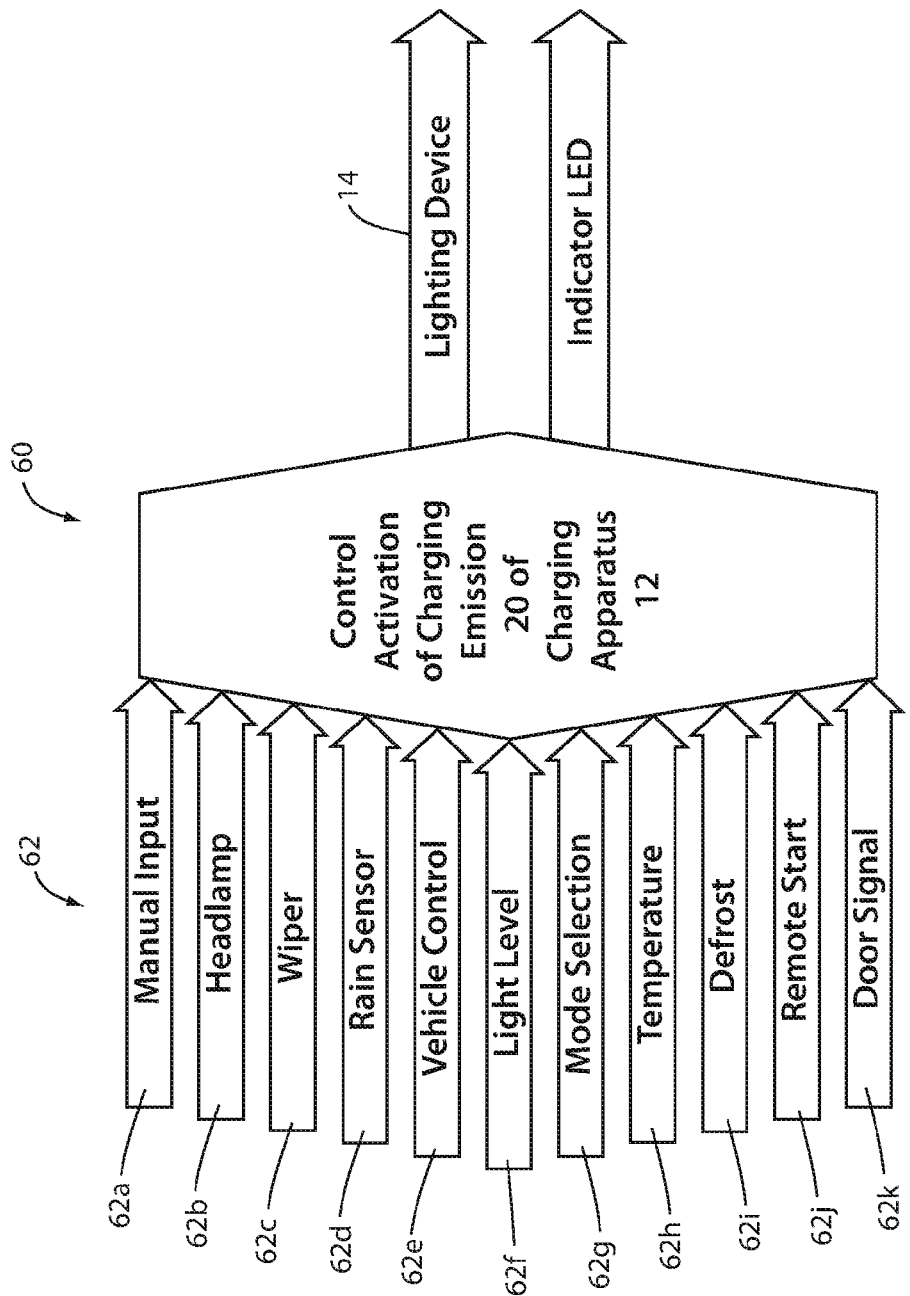
FIG. 4 is a process diagram demonstrating a plurality of control inputs utilized by a control algorithm of an illumination apparatus.

Referring now to FIG. 4, a control diagram 60 of the charging apparatus 12 is shown demonstrating a plurality of control inputs 62 that may be utilized by a control algorithm of the controller to control the activation of each of the light sources 16. The control inputs 62 may correspond to signals received from various sensors 34 incorporated in the vehicle, some of which may be communicated via a communication bus 74 of the vehicle. The control inputs 62 may include any signals that may be communicated from one or more systems of the vehicle. Examples of control inputs may include any combination of the following control inputs 62: a manual input 62a from the control circuits 38 (e.g. the switch 40), a headlamp control signal 62b, a rain wiper signal 62c, a rain sensor signal 62d from the rain sensor, a vehicle control signal 62e from the vehicle control module (e.g. airbag deployment signal, tire pressure warning, engine fault, etc.), a light level signal 62f from the light sensor 34, a mode selection 62g from a user interface, a temperature signal 62h from a vehicle thermometer, a defrost signal 62i from a window defrost unit, a remote start signal 62j from a remote starter, a door signal 62k from the door sensor 32, etc. Accordingly, the controller may be configured to charge the photoluminescent object 24 in response to a variety of the control inputs 62 to suit various applications.

For example, in response to a vehicle fault, the vehicle control module 72 may communicate the vehicle control signal 62e to the controller. If the control signal 62e is received in combination with the light level signal 62f identifying that the ambient light is below a predetermined light level, the controller may respond by activating the charging apparatus 12. Similarly, the controller may determine that the ambient light level is below the predetermined light level in response to the headlamp control signal 62b indicating the headlights of the vehicle 10 are active. Additionally, the controller may determine if the door signal 62k from the door sensor 32 indicates that the access door 30 is closed prior to activating the lighting device 14. The controller may activate the lighting device 14 of the charging apparatus 12 for a predetermined time to charge the photoluminescent object 24 in the storage compartment 18.

In some embodiments, the controller may additionally or alternatively be configured to activate the lighting device 14 of the charging apparatus 12 to charge the photoluminescent object 24 in response to various individual signals or combinations of control inputs 62. For example, in response to an indication of rain (e.g. receiving rain wiper signal 62c from the control module or a rain sensor signal 62d from the rain sensor), the controller may activate the lighting device 14 to charge the photoluminescent object 24 (e.g. the high visibility garment 24f, an illuminated umbrella 24g, etc.). Additionally, the controller may activate the lighting device 14 in response to a combination of the indication of rain with an indication that the ambient light level is below the predetermined light level. Accordingly, the controller may be configured to charge the photoluminescent object 24 in response to dark, rainy conditions. Though specific combinations of the signal utilized by the controller to control the charging apparatus 12 are discussed in detail, it shall be understood that the controller may be configured to control the charging apparatus 12 in response to individual control inputs 62 or various combinations of the control inputs 62 as discussed herein.

In some embodiments, the controller of the charging apparatus 12 may be configured to detect and/or learn a usage pattern of the vehicle 10 based on one or more of the control inputs 62. For example, the controller may track and identify times of the day and days of the week (additionally calendar months) that correspond to a schedule of use of the vehicle 10. The controller may identify that the vehicle is typically utilized during specific portions of the day (e.g. 7:00 AM-9:00 AM and 4:30 PM-6:15 PM Monday through Friday) by detecting usage of the vehicle based the control inputs 62. Based on the usage schedule of the vehicle 10, the controller may selectively activate the lighting device 14 for a predetermined time preceding the expected time of use or occupancy of the vehicle 10. In this way, the controller may charge the photoluminescent objects 24 such that the persistent luminescent portions 52 are charged to emit the output emission 26 when the vehicle is typically utilized.

Figure 5:
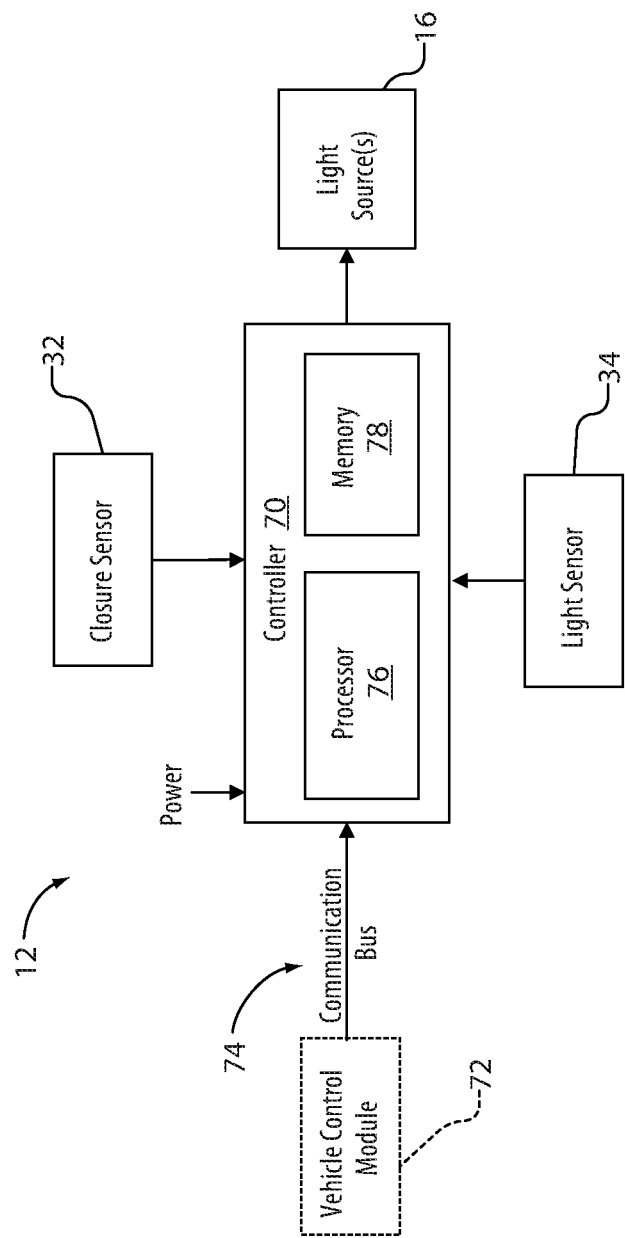
FIG. 5 is a block diagram of a controller configured to control an illumination apparatus for a storage compartment in accordance with the disclosure.

Referring to FIG. 5, a block diagram of a controller or a controller 70, which may be configured to control the charging apparatus 12 is shown. The controller 70 may be in communication with a vehicle control module 72 via a communication bus 74 of the vehicle 10. The communication bus 74 may be configured to deliver signals to the controller 70 identifying various control inputs 62 and/or states of the vehicle 10. For example, the communication bus 74 may be configured to communicate the headlamp control signal 62b, the rain wiper signal 62c, the rain sensor signal 62d, the vehicle control signal 62e (e.g. airbag deployment signal, tire pressure warning, engine fault, etc.), the light level signal 62f, a mode selection 62g from a user interface, a temperature signal 62h, a defrost signal 62i, a remote start signal 62j, or any other information or control inputs 62 that may be communicated via the communication bus 74. In this way, the controller 70 may selectively activate the light sources 16 of the charging apparatus 12 in response to one or more conditions communicated by the vehicle control module 72.

The controller 70 may include a processor 76 comprising one or more circuits configured to receive the signals from the communication bus 74 and output signals to control the charging apparatus 12. The processor 76 may be in communication with a memory 78 configured to store instructions to control the activation of the light sources 16. The controller 70 may further be in communication with the door sensor 32 to monitor a closure status of the access door 30 and the ambient light sensor 34 to determine an ambient light level of the environment proximate the vehicle 10. Based on the various inputs from the sensors 32 and 34, as well as the control inputs 62 from communication bus 74, the controller 70 may selectively activate the charging apparatus 12 to charge the persistent luminescent portions 52 of the photoluminescent objects 24 based on a various individual signals or combinations of the signals as discussed in reference to FIG. 4.

The ambient light sensor 34 may be operable to communicate a light condition, for example a level brightness or intensity of the ambient light proximate the vehicle 10. Accordingly, the controller 70 may be operable to charge the photoluminescent objects 24 during periods wherein the ambient light proximate the vehicle 10 is below a threshold light level. In this configuration, the controller 70 may conserve energy from a battery of the vehicle 10 by limiting charge cycles of the charging apparatus 12 to periods when the lighting conditions proximate the vehicle 10 are conducive to illuminated objects, such as the photoluminescent objects 24 discussed herein.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle charging compartment comprising:
    a charging device comprising a plurality of light sources configured to emit a charging emission and disposed on an interior surface formed by the compartment; and
    a controller configured to selectively illuminate the charging device in response to an environmental condition and a vehicle fault communicated to the controller.

2. The vehicle charging compartment according to claim 1, wherein the light sources are distributed on the interior surface to consistently illuminate a volume enclosed by the compartment.

3. The vehicle charging compartment according to claim 1, wherein the charging emission comprises a wavelength of light configured to charge a photoluminescent material of an article disposed in the compartment.

4. The vehicle charging compartment according to claim 1, further comprising a sensor configured to monitor the environmental condition in communication with the controller.

5. The vehicle charging compartment according to claim 4, wherein the sensor corresponds to at least one of a light sensor and a rain sensor.

6. The vehicle charging compartment according to claim 5, wherein the controller is configured to activate the charging device in response to an indication of the vehicle fault condition and the light sensor indicating that the ambient light proximate the vehicle is less than a brightness threshold.

7. The vehicle charging compartment according to claim 1, wherein the compartment is configured to receive an article comprising a persistent photoluminescent material.

8. A vehicle charging compartment comprising:
    a charging device comprising a plurality of light sources configured to emit a charging emission and disposed on an interior surface formed by the compartment;
    a light sensor configured to monitor an ambient light proximate the vehicle; and
    a controller configured to selectively illuminate the charging device in response to a vehicle fault communicated to the controller and the ambient light being less than a brightness threshold.

9. The vehicle charging compartment according to claim 8, further comprising an access door configured to provide access to an interior volume of the compartment.

10. The vehicle charging compartment according to claim 9, further comprising a door sensor in communication with the controller and configured to identify a closed status of the access door.

11. The vehicle charging compartment according to claim 10, wherein the controller is configured to control the activation of the charging device to only activate when the closed status is indicated by the door sensor.

12. The vehicle charging compartment according to claim 8, wherein the vehicle fault condition corresponds to at least one of a tire inflation warning, an engine fault, a remote start indication, and a collision detection.

13. The vehicle charging compartment according to claim 8, further comprising a reflective coating applied to the interior surface.

14. The vehicle charging compartment according to claim 13, wherein the reflective coating is configured to reflect the charging emission.

15. The vehicle charging compartment according to claim 8, wherein the controller is configured to control the charging device to emit the charging emission for a predetermined time.

16. A method for controlling a charging apparatus comprising:
    detecting a control signal identifying a vehicle operating state;
    identifying a closure status of an access door of a storage compartment; and
    activating a light source to emit a charging emission in response to the closure status and the control signal, wherein the charging emission is configured to charge a photoluminescent material disposed in the storage compartment.

17. The method according to claim 16, further comprising:
    monitoring an activation time of the light source.

18. The method according to claim 16, further comprising:
    deactivating the light source after a predetermined time, wherein the predetermined time corresponds to a charging period of the photoluminescent material.

19. The method according to claim 16, further comprising:
    identifying a light condition of an environment proximate the vehicle, wherein the controller is configured to suppress the activating of the light source in response to the light condition exceeding a minimum brightness threshold.

20. The method according to claim 16, wherein the control signal corresponding to the environmental condition is received from a rain sensor.

* * * * *